United States Patent
Aberg

(10) Patent No.: US 8,522,638 B2
(45) Date of Patent: Sep. 3, 2013

(54) SHIFT FORK

(75) Inventor: Magnus Aberg, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 235 days.

(21) Appl. No.: 12/913,664

(22) Filed: Oct. 27, 2010

(65) Prior Publication Data

US 2011/0179899 A1    Jul. 28, 2011

(30) Foreign Application Priority Data

Oct. 29, 2009  (GB) .................................. 0918973.9

(51) Int. Cl.
*F16H 63/32*    (2006.01)

(52) U.S. Cl.
USPC .................... 74/473.37; 74/473.36; 184/11.2; 184/13.1; 184/65

(58) Field of Classification Search
USPC ............ 74/473.37, 473.36, 606 R; 184/6.12, 184/11.1, 11.2, 11.3, 11.4, 13.1, 15.3, 65, 184/80
See application file for complete search history.

(56) References Cited

U.S. PATENT DOCUMENTS

| | | | | |
|---|---|---|---|---|
| 3,529,698 A * | 9/1970 | Nelson | .......................... | 184/6.12 |
| 3,587,783 A * | 6/1971 | Walters | ........................ | 184/11.1 |
| 3,915,027 A * | 10/1975 | Simmons et al. | ............ | 74/473.1 |
| 3,929,029 A * | 12/1975 | Kelbel | ........................ | 74/473.21 |
| 4,221,279 A * | 9/1980 | Jones et al. | ................... | 184/11.1 |
| 4,231,266 A * | 11/1980 | Nishikawa et al. | ............. | 74/467 |
| 4,329,887 A | 5/1982 | Kawamoto | | |
| 4,480,493 A * | 11/1984 | Takahashi | ........................ | 74/467 |
| 4,987,974 A | 1/1991 | Crouch | | |
| 5,799,540 A | 9/1998 | Diehl et al. | | |
| 5,842,380 A * | 12/1998 | Bierlein et al. | ............. | 74/473.37 |
| 7,195,103 B2 * | 3/2007 | Bathe et al. | ................... | 184/13.1 |
| 2004/0108168 A1 * | 6/2004 | Bathe et al. | ................... | 184/6.12 |
| 2012/0011955 A1 * | 1/2012 | Hada et al. | ................... | 74/473.3 |
| 2012/0096968 A1 * | 4/2012 | Kawamoto et al. | ............. | 74/467 |

FOREIGN PATENT DOCUMENTS

| | | | |
|---|---|---|---|
| DE | 10337908 A1 | | 3/2005 |
| FR | 2836710 | * | 9/2003 |
| GB | 2042106 A | | 9/1980 |
| GB | 2053381 A | * | 2/1981 |
| JP | 10299876 A | * | 11/1998 |
| JP | 2005265136 A | | 9/2005 |
| JP | 2009133375 | * | 6/2009 |
| JP | 2011127634 A | * | 6/2011 |
| WO | 2007020433 A1 | | 2/2007 |

* cited by examiner

*Primary Examiner* — Troy Chambers
*Assistant Examiner* — Valentin Craciun
(74) *Attorney, Agent, or Firm* — Ingrassia Fisher & Lorenz, P.C.

(57) ABSTRACT

A Shift fork is provided for shifting gears of a transmission assembly of a gear box that includes, but is not limited to a basin for collecting splash oil. The basin includes, but is not limited to an outlet channel for guiding the collected oil away from the basin. By means of the basin splash oil can be collected and led via the outlet channel to nearly every place of the transmission assembly, where additional lubrication is wanted. This provides a better lubrication of parts of the transmission assembly with low effort.

18 Claims, 2 Drawing Sheets

SHIFT FORK

CROSS-REFERENCE TO RELATED APPLICATION

This application claims priority to British Patent Application No. 0918973.9, filed Oct. 29, 2009, which is incorporated herein by reference in its entirety.

TECHNICAL FIELD

The technical field relates to a shift fork, by means of which gears of a transmission assembly of a gear box of a motor vehicle can be shifted.

BACKGROUND

It is known to design a shift fork as a massive casted part comprising a mainly smooth surface so that splash oil can run over the smooth surface and can drop to the parts of the transmission assembly located vertically under the shift fork. There is a permanent need for providing a better lubrication of parts of the transmission assembly with low effort.

In view of the foregoing, it is at least one object of the invention to provide a better lubrication of parts of the transmission assembly with low effort. In addition, other objects, desirable features, and characteristics will become apparent from the subsequent summary and detailed description, and the appended claims, taken in conjunction with the accompanying drawings and this background.

SUMMARY

According to an embodiment of the invention, a shift fork is provided for shifting gears of a transmission assembly of a gear box, comprising a basin for collecting splash oil, wherein the basin comprises an outlet channel for guiding the collected oil away from the basin. By means of the basin splash oil can be collected and led via the outlet channel to nearly every place of the transmission assembly, where additional lubrication is wanted. This provides a better lubrication of parts of the transmission assembly with low effort. The length of the outlet channel and/or a subsequent channel communicating with the outlet channel particularly mainly in parallel to the transmission shafts of the transmission assembly can be adjusted nearly at will for providing a discharge opening at every intended place.

Particularly a bearing located far away from an oil sump, which can be hardly reached by splash oil, can be provided with splash oil collected by the basin of the shift fork, which leads in turn to a sufficient lubrication of the bearing. Further the collected oil can be distributed to two or more different places, wherein the amount of the different flows can be adjusted particularly by the size of different discharge openings communicating with the outlet channel. Additional separated parts for collecting splash oil are not necessary. Further the transmission overall weight can be reduced. Also both machining and assembly complexity can be reduced. By means of the basin the shift fork can be more comfortable actuated by less forces for instance due to the better lubrication of the supporting ends of the actuating shaft.

Further the reduced weight leads to less mass of a motor vehicle, which in turn reduces the required $CO_2$ emission of a combustion engine for accelerating the motor vehicle. When the shift fork is moved back and forth along its movement axis, the discharge opening stays mainly at the same place and does not significantly change the lubrication conditions at this place. The outlet channel may terminate at a hub for receiving a particularly at least partially hollow actuating shaft, which preferably communicates with the basin via the outlet channel. The hollow part of the actuating shaft may be designed as bore aligned mainly in parallel to the main transmission shaft. If so, the hub can be elongated in axial direction for adjusting the place for discharging the splash oil and/or for forming an actuating shaft by the hub itself.

In a preferred embodiment, at least one collector rib for directing splash oil to the basin is provided. Splash oil inside the gear box can hit the collector rib and can flow downwards by means of gravity over the outer surface of the collector rib until the oil meets the basin, where the oil can be guided further to a specific place. By means of the collector rib the amount of collected splash oil can be significantly increased.

The collector rib or a plurality of collector ribs can be of simple design and easily manufactured, for instance by casting particularly die casting. Particularly the collector rib is connected to the basin such that the basin is reinforced by the collector rib. Forces applied to the shift fork can be born and transferred via the collector rib. The collector rib can be designed in accordance to usual light weight construction techniques. Due to the reinforcement provided by the collector rib a reduction of the mechanical stability of the shift fork is prevented. A deformation of border walls bordering the basin can be prevented or at least reduced.

Preferably at least two collector ribs cross each other. Due to the crossing collector ribs forces from all directions can be born and transferred. This leads to a good reinforcement of the shift fork particularly in the region of the basin. Further preferred the collector rib is one-piece with a fork body forming the basin, wherein particularly the collector rib and the fork body are made by casting. A good reinforcement effect is given in the region of the basin. Due to the simple form of the collector rib an easy manufacturing by casting particularly die casting is possible. Even a plurality of collector ribs can be provided as one-piece casting piece without the need of additional separate casting cores.

Particularly the largest part of the collector rib is aligned mainly vertically. Since the shift fork is usually only shifted back and forth along its movement axis the largest part of the collector rib can protrude from the basin and/or from the fork body mainly vertically at every position of the shift fork during operation. Due to the mainly vertical alignment of the collector rib a high amount of splash oil can be collected from the collector rib without the need of providing a large height of the collector rib.

Preferably the basin is divided into at least two basin parts by the collector rib, wherein the basin parts communicate with each other via a flow aperture provided in the collector rib. A high area of the shift fork can be used for providing the basin without decreasing the stability of the shift fork. Due to the flow apertures oil from one basin part can flow to the other basin part without being blocked by the collector rib. It is not necessary to wait until oil swaps over the collector rib from one basin part to the basin part with the outlet channel.

Particularly the largest part of a basin bottom part is aligned mainly horizontally. Particularly in a volume of the transmission assembly, where no other parts are located, the bottom part protruding from the fork body may be provided. The bottom part provides an additional surface for collecting splash oil leading to an increased oil flow provided via the outlet channel.

Preferably a hollow actuating shaft communicating with the basin via the outlet channel is provided, wherein the actuating shaft comprises a discharge opening for discharging oil. The at least one discharge opening can be provided at a peripheral surface and/or at a front face of the actuating shaft. The actuating shaft may also comprise an opening, for instance a bore, wherein the opening communicates with the outlet channel and/or is a part of the outlet channel. Particularly the material of the actuating shaft provides a part of the bottom of the basin. For instance the basin may comprise a large bottom opening in bottom, wherein the large bottom opening defines the outlet channel. The actuating shaft may cover the largest part of the bottom opening by the material of the actuating shaft, wherein due to the opening of the shaft a flow connection between the basin and a hollow part of the actuating shaft is provided. The collected splash can flow from the basing via the bottom opening and the opening of the actuating shaft to the hollow part, particularly an axial bore, of the actuating to a discharge opening located away from the basin of the shift fork. Since the actuating shaft can be provided along the whole length of the transmission assembly, particularly mainly in parallel to the main transmission shaft, it is possible to direct the oil flow via the actuating shaft to nearly every place, where an additional lubrication is wanted.

Particularly the actuating shaft is press fitted into a fork body forming the basin, wherein particularly the actuating shaft and/or the fork body are made by casting. It is possible to manufacture the fork body and the actuating shaft as separate building parts. For instance the actuating shaft, which can be made from a round bar steel, can be pressed into a hub of the shift fork body. If so, the actuating shaft can be further secured by a press pin. In the alternate the actuating shaft is one-piece with the fork body, wherein particularly the actuating shaft and the fork body are made by casting preferably die casting. Particularly mainly no assembling effort for providing the shift fork is necessary. Further a secure connection between the actuating shaft with the fork body is given without additional fastening means.

The embodiments of the invention further relate to a gear box of a motor vehicle, comprising at least one transmission shaft comprising at least one moveable gear wheel of a gear, and a shift fork for shifting the gear, wherein the shift fork can be designed as previously described. By means of the basin splash oil can be collected and led via the outlet channel to nearly every place of the transmission assembly of the gear box, where additional lubrication is wanted. This provides a better lubrication of parts of the transmission assembly with low effort.

Particularly, the transmission shaft is driven by a drive wheel adapted for extending into an oil sump, wherein the basin of the shift fork is at least partially positioned into an oil shower providable by the drive wheel, wherein particularly the basin of the shift fork is at least partially positioned vertically with respect to the drive wheel. The basin of the shift fork can be positioned, where a high amount of the splash oil provided by the rotation of the drive wheel is present. This increases the amount of oil collected by the shift fork.

Preferably, the transmission shaft is born by a first bearing and a second bearing, wherein the first bearing is located closer to the basin of the shift fork than the second bearing, wherein the central opening is adapted for leading oil collected by the basin to the second bearing inside an actuating shaft of the shift fork. It is used the insight that the first bearing close to the shift fork will usually receive enough splash oil, so that the second bearing on the other end of the transmission shaft can be lubricated via the suitable designed hollow actuating shaft communicating with the basin and a suitable positioned discharge opening. Particularly, only the second bearing is provided with the collected splash oil from the shift fork.

Particularly, a housing forming an oil sump is provided. The transmission assembly can be designed as previously described. In the oil sump a sufficient amount of oil can be present, which can be transported upwards by the rotating drive wheel. By means of the basin splash oil origin from the oil sump can be collected and led via the outlet channel to nearly every place inside the gear box, where additional lubrication is wanted.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
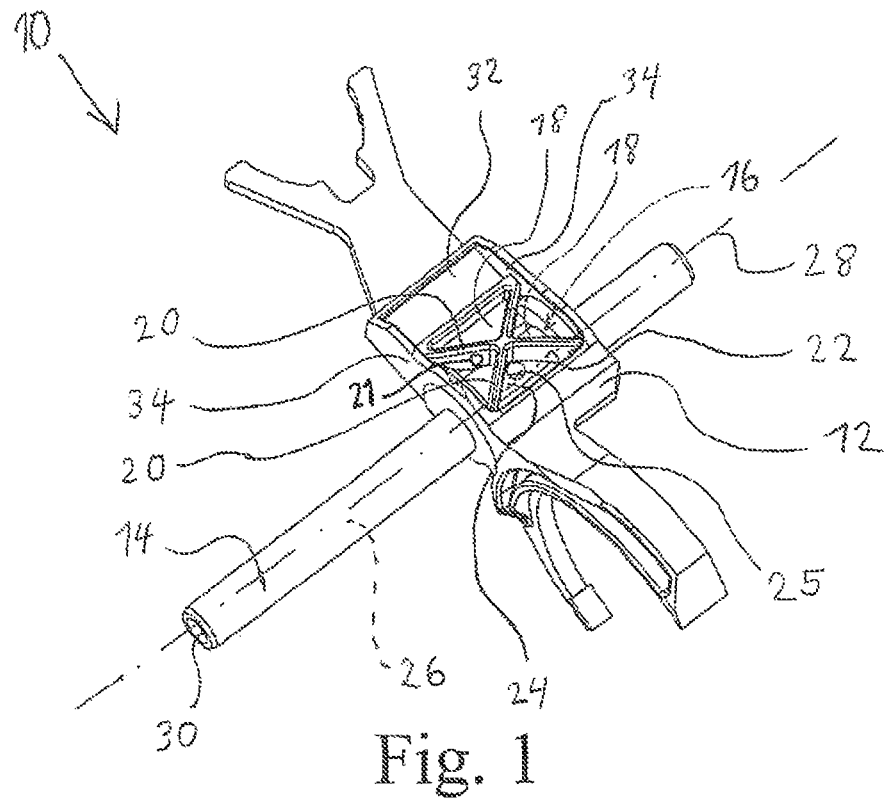
FIG. 1 is a schematic perspective view of a shift fork.

The shift fork 10 as illustrated in FIG. 1 comprises a fork body 12 into which an actuating shaft 14 is press fitted in the illustrated embodiment. By means of the actuating shaft 14 the shift fork 10 can be born and axially displaced. The fork body 12 comprises a basin 16, which is divided into four basin parts 18 by means of two collecting ribs 20, which cross each other. The basin parts 18 may communicate with each other via a flow aperture 21 provided in the collector rib 20. The collecting ribs 20 reinforce the basin 16 and can collect splash oil. The splash oil flows over an outer surface 22 of the collecting ribs downwards into the basin 16. From the basin 16 the collected oil flows via an outlet channel 24 and an opening 25 of the actuating shaft 14 to a hollow part 26 of the actuating shaft 14. The hollow part 26 is designed as bore. The hollow part 26 of the actuating shaft 14 is provided coaxially in the actuating shaft 14 and aligned coaxially to a movement axis 28 of the shift fork 10. In the illustrated embodiment the movement axis 28 is also the middle axis of the actuating shaft 14.

Figure 2:
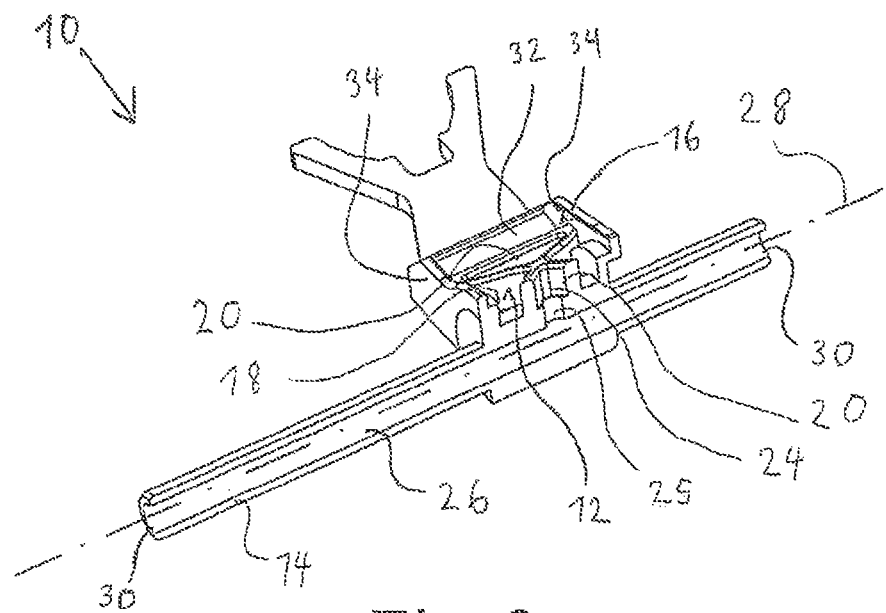
FIG. 2 is a schematic perspective sectional view of the shift fork of FIG. 1.

As can be derived particularly from FIG. 2 the hollow part 26 comprises at each of its two front faces a discharge opening 30. Since the discharge openings 30 are spaced to the basin 16, the collected oil can be discharged far away from the basin 16 at a place, where splash oil is hardly received. A basin bottom part 32 is provided mainly horizontally for collecting additional splash oil. The basin 16 is bordered by border walls 34 of the fork body 12, wherein at the radial end of the basin bottom part 32 a border wall 34 is not necessary due to a sufficient rising in vertical direction of the basin bottom part 32.

Figure 3:
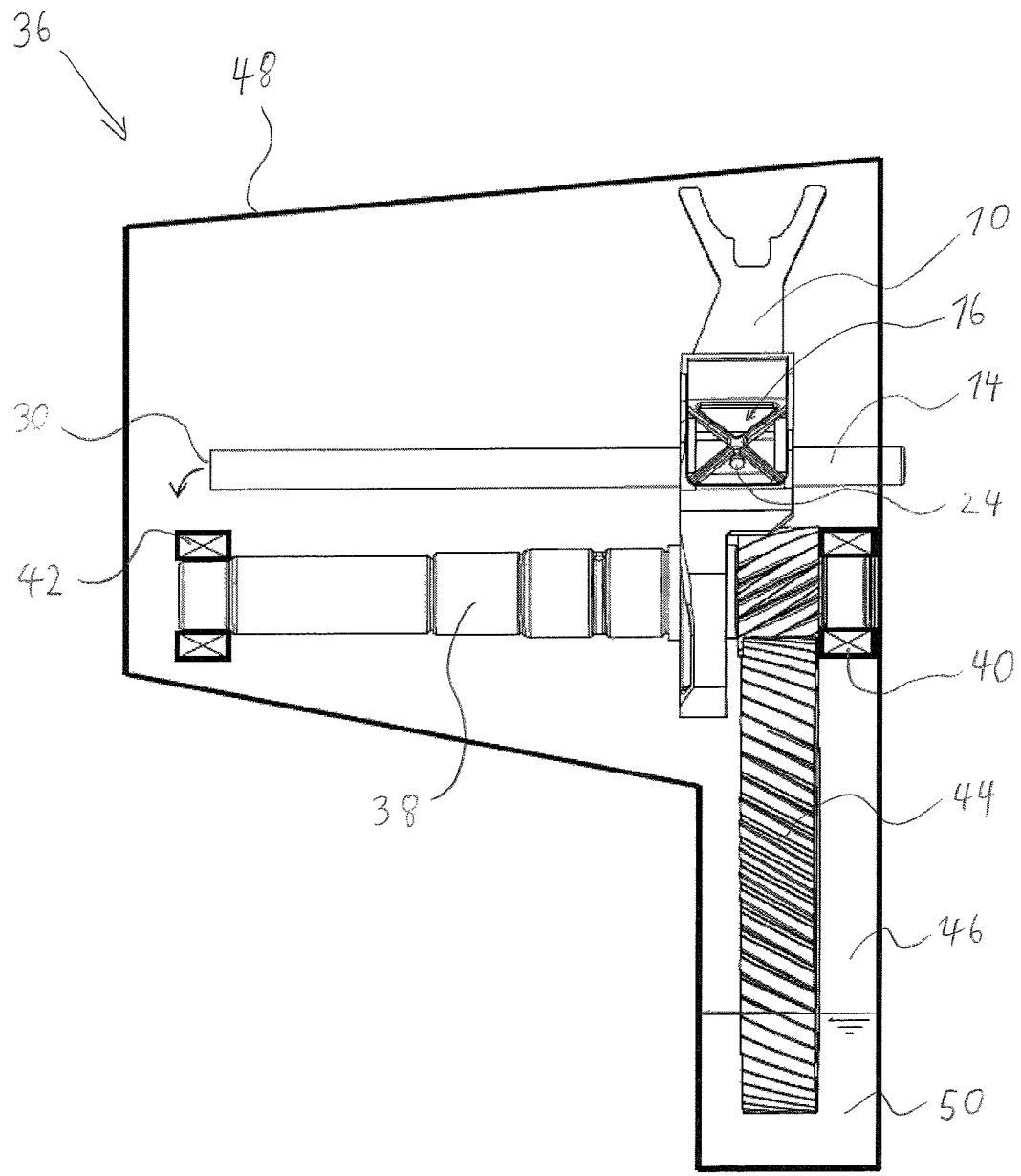
FIG. 3 is a schematic side view of a gear box comprising the shift fork of FIG. 1.

The gear box 36 as illustrated in FIG. 3 comprises a transmission shaft 38, which is born by a first bearing 40 and a second bearing 42. The transmission shaft 38 is driven by a drive wheel 44, which extends into an oil sump 46. The oil sump 46 is provided by a housing 48 and partially filled with oil 50. The rotating drive wheel 44 transports the oil 50 from the oil sump 46 upwards and provides an oil shower. The splash oil of this oil shower is collected by the basin 16 of the shift fork 10 and led via the discharge opening 30 to the second bearing 42. The second bearing 42 is sufficiently lubricated although the second bearing 42 is positioned far away from the drive wheel 44 and the provided splash oil.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A shift fork for shifting gears of a transmission assembly of a gear box, the shift fork comprising
    a basin collecting splash oil;
    an outlet channel of the basin guiding the splash oil away from the basin; and
    a hollow actuating shaft receiving the oil from the basin via the outlet channel, wherein the hollow actuating shaft comprises a discharge opening for discharging the oil.
2. The shift fork according to claim 1, further comprising a collector rib adapted to direct the splash oil to the basin.
3. The shift fork according to claim 2 wherein the collector rib is connected to the basin such that the basin is reinforced by the collector rib.
4. The shift fork according to claim 2, further comprising a second collector rib that crosses the collector rib.
5. The shift fork according to claim 2,
    wherein the collector rib is one-piece with a fork body forming the basin, and
    wherein the collector rib and the fork body are cast.
6. The shift fork according to claim 2, wherein a largest part of the collector rib is aligned mainly vertically.
7. The shift fork according to claim 2,
    wherein the basin comprises at least two basin parts divided by the collector rib, and
    wherein the at least two basin parts are adapted to communicate with each other via a flow aperture provided in the collector rib.
8. The shift fork according to claim 1, wherein a largest part of a bottom of the basin protrudes mainly horizontally.
9. The shift fork according to claim 1,
    wherein the hollow actuating shaft is press fitted into a fork body forming the basin, and
    wherein the hollow actuating shaft is cast.
10. The shift fork according to claim 1,
    wherein the hollow actuating shaft is press fitted into a fork body forming the basin, and
    wherein the fork body is cast.
11. A gear box for a motor vehicle, comprising:
    at least one transmission shaft comprising at least one moveable gear wheel of a gear; and
    a shift fork shifting the gear, the shift fork comprising:
        a basin collecting splash oil; and
        an outlet channel of the basin guiding the splash oil away from the basin,
    wherein the at least one transmission shaft is born by a first bearing and a second bearing,
    wherein the first bearing is located closer to the basin of the shift fork than the second bearing, and
    wherein a central opening is adapted for leading the oil collected by the basin to the second bearing inside an actuating shaft of the shift fork.
12. The gear box according to claim 11,
    wherein the at least one transmission shaft is driven by a drive wheel adapted for extending into an oil sump,
    wherein the basin of the shift fork is at least partially positioned into an oil shower providable by the drive wheel, and
    wherein the basin of the shift fork is at least partially positioned vertically with respect to the drive wheel.
13. The gear box according to claim 11, further comprising a housing adapted to form the oil sump.
14. The gear box according to claim 11, the shift fork further comprising a collector rib adapted to direct the splash oil to the basin.
15. The gear box according to claim 14, wherein the collector rib is connected to the basin such that the basin is reinforced by the collector rib.
16. The gear box according to claim 14, the shift fork further comprising a second collector rib that crosses the collector rib.
17. The gear box according to claim 14,
    wherein the collector rib is one-piece with a fork body forming the basin, and
    wherein the collector rib and the fork body are cast.
18. The gear box according to claim 14, wherein a largest part of the collector rib is aligned mainly vertically.

\* \* \* \* \*